(12) United States Patent
Lebron et al.

(10) Patent No.: US 11,826,961 B2
(45) Date of Patent: Nov. 28, 2023

(54) NESTED SEGMENTS IN OBJECT MODELS FOR ADDITIVE MANUFACTURING

(71) Applicant: HEWLETT-PACKARD DEVELOPMENT COMPANY, L.P., Houston, TX (US)

(72) Inventors: Hector Jose Lebron, San Diego, CA (US); Jake Wright, San Diego, CA (US); Stephen G. Rudisill, San Diego, CA (US); Matthew A. Shepherd, Vancouver, WA (US); Vanessa Verzwyvelt, Vancouver, WA (US); Morgan T. Schramm, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1276 days.

(21) Appl. No.: 16/075,210

(22) PCT Filed: Jul. 10, 2017

(86) PCT No.: PCT/US2017/041297
§ 371 (c)(1),
(2) Date: Aug. 3, 2018

(87) PCT Pub. No.: WO2019/013738
PCT Pub. Date: Jan. 17, 2019

(65) Prior Publication Data
US 2020/0406553 A1  Dec. 31, 2020

(51) Int. Cl.
*B29C 64/393* (2017.01)
*G06T 19/00* (2011.01)
(Continued)

(52) U.S. Cl.
CPC ............ *B29C 64/393* (2017.08); *B33Y 50/00* (2014.12); *G06F 30/00* (2020.01); *G06T 19/00* (2013.01); *B33Y 50/02* (2014.12); *G06F 2113/10* (2020.01)

(58) Field of Classification Search
CPC ...... B33Y 50/00; G06T 19/00; G06F 2113/10
See application file for complete search history.

(56) References Cited

U.S. PATENT DOCUMENTS 6,012,145 A    1/2000   Mathers et al.
8,920,697 B2  12/2014   Mikulak et al.
(Continued)

FOREIGN PATENT DOCUMENTS

WO       2016068899 A1   5/2016
WO    WO-2016140670 A1   9/2016
(Continued)

OTHER PUBLICATIONS

Hoffman, "Hard Disk Passwords Explained: Should You Set One to Secure Your Files?", Retrieve from the website—https://www.howtogeek.com/186881/hard-disk-passwords-explained-should-you-set-one-to-secure-your-files/, Apr. 14, 2014, 4 Pages.
(Continued)

*Primary Examiner* — Bijan Mapar
(74) *Attorney, Agent, or Firm* — Michael Dryja

(57) ABSTRACT

In an example, a method include receiving a data model of an object to be generated in additive manufacturing at a processor, the data model comprising object property data. A segmentation of a virtual build volume comprising at least a portion of the object into a plurality of nested segments may be derived. A first segment may be associated with first object generation parameters and a second segment may be associated with second, different, object generation parameters. A number of nested segments to be derived may be
(Continued)

determined based on at least one of a geometry of the object and an intended object property.

16 Claims, 5 Drawing Sheets

(51) Int. Cl.
  *G06F 30/00* (2020.01)
  *B33Y 50/00* (2015.01)
  *B33Y 50/02* (2015.01)
  *G06F 113/10* (2020.01)

(56) References Cited

U.S. PATENT DOCUMENTS

| | | |
|---|---|---|
| 9,043,610 B2 | 5/2015 | Wang et al. |
| 2005/0027989 A1 | 2/2005 | Sandhu et al. |
| 2005/0114686 A1 | 5/2005 | Ball et al. |
| 2007/0088947 A1 | 4/2007 | Cross et al. |
| 2007/0297608 A1 | 12/2007 | Jonas et al. |
| 2008/0155680 A1 | 6/2008 | Guyot et al. |
| 2009/0080662 A1 | 3/2009 | Thibadeau |
| 2013/0055382 A1 | 2/2013 | Bhattiprolu et al. |
| 2015/0045928 A1 | 2/2015 | Perez et al. |
| 2015/0259548 A1 | 9/2015 | Wang et al. |
| 2016/0209819 A1 | 7/2016 | Cudak et al. |
| 2020/0016822 A1* | 1/2020 | Levy ............ B33Y 80/00 |

FOREIGN PATENT DOCUMENTS

| | | |
|---|---|---|
| WO | 2016171724 A1 | 10/2016 |
| WO | 2016175748 A1 | 11/2016 |
| WO | 2016175813 A1 | 11/2016 |
| WO | WO-2016186609 A1 | 11/2016 |
| WO | WO-2016186613 A1 | 11/2016 |

OTHER PUBLICATIONS

Perez et al., "Unlocking machine-readable storage devices using a user token", Retrieve from google patents—https://patents.google.com/patent/WO2018022091A1/en, 2016, 2 Pages.

Yusuf, "3D Printing Technology Guide: 9 Basic Types of 3d Printers", Retrieved from Internet: https://all3dp.com/types-of-3d-printer-technology-explained/, Dec. 2016, 28 pages.

Krassenstein, "Why HP's 3D Printing Technology is Amazing, What the Future Holds, and Where Their Competitors Stand", 3D Printers, Retrieved from Internet: https://3dprint.com/22033/hp-3d-printing-technology-hpq/, Oct. 30, 2014, 6 pages.

\* cited by examiner

NESTED SEGMENTS IN OBJECT MODELS FOR ADDITIVE MANUFACTURING

BACKGROUND

Three-dimensional (3D) printing is an additive manufacturing process in which three-dimensional objects may be formed, for example, by the selective solidification of successive layers of a build material. The object to be formed may be described in a data model. Selective solidification may be achieved, for example, by fusing, binding, or solidification through processes including sintering, extrusion, and irradiation. The quality, appearance, strength, and functionality of objects produced by such systems can vary depending on the type of additive manufacturing technology used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

Another example of a print agent is a coalescence modifying agent (which may be referred to as a modifying or a detailing agent), which acts to modify the effects of a fusing agent and/or energy applied, for example by inhibiting, reducing or increasing coalescence or to assist in producing a particular finish or appearance to an object.

A property modification agent, for example comprising a dye, colorant, a conductive agent, an agent to provide transparency or elasticity or the like, may in some examples be used as a fusing agent or a modifying agent (which use may depend on a type of print agent with which it is combined), and/or as a print agent to provide a particular property for the object.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices in parallel planes of the model. Each slice may define at least a portion of a respective layer of build material that is to be solidified or caused to coalesce by the additive manufacturing system.

Figure 1:
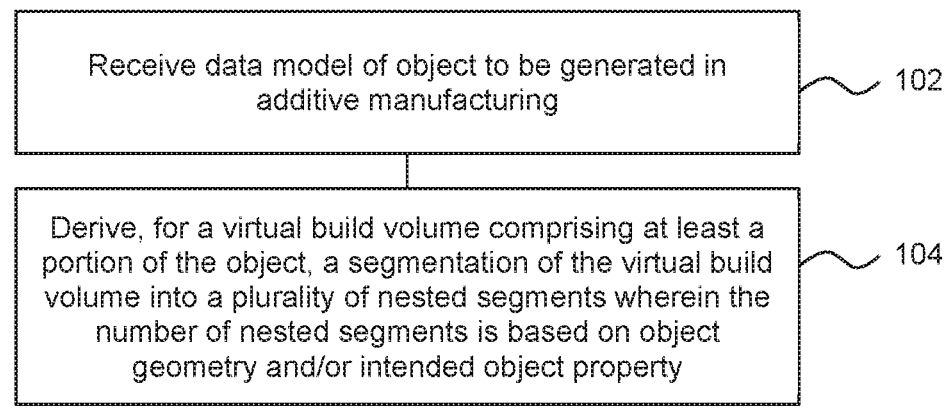
FIG. 1 is an example of a method for generating a segmented data model for an object to be generated in additive manufacturing.

FIG. 1 shows an example of a method which may be a computer implemented method, for example carried out using at least one processor, and may comprise a method of generating a segmented data model for an object to be generated in additive manufacturing. The segments may for example represent nested 'shells' of an object to be generated and/or a surrounding region which may be generated using different processing parameters. In some examples, at least some segments may for example represent object portions which are to be generated using particular combinations of print agents so as to have different properties, for example different colors, or different mechanical/functional properties. In some examples, the processing parameters may specify accessible print agents, print agent combination(s), and/or print agent amounts, which may differ between segments. In some examples, the processing parameters may be held in the form of a mapping resource such as a look-up table or mapping algorithm used to identity print agent amounts and/or combinations to apply to an object region corresponding to a particular object portion, with different mapping resources being associated with different segments. For example, a particular intended color may be provided by an outer shell having a first color, an inner shell having a different color, and a core of a third color.

Block 102 comprises receiving, at a processor, a data model of an object to be generated in additive manufacturing. The data model may for example be received from a memory, over a network, over a communications link or the like. The data model comprises object property data. In some examples, the data model may for example comprise object model data and object property data. The object model data may define a three-dimensional geometric model of at least a portion of the model object, including the shape and extent of all or part of an object in a three-dimensional co-ordinate system, e.g. the solid portions of the object. In some examples, the data model may represent the surfaces of the object, for example as a mesh. The object model data may for example be generated by a computer aided design (CAD) application. Object property data may define at least one object property for at least a portion of the three-dimensional object to be generated. If no object property data is present the object may have some default properties based on the build material and print agents used. In one example, the object property data may comprise any or any combination of mechanical and/or appearance properties, for example an intended color, flexibility, elasticity, rigidity, surface roughness, porosity, inter-layer strength, tensile strength, density, transparency, conductivity and the like for at least a portion of the object to be generated. The object property data may define multiple object properties for a portion or portions of an object, and the properties specified may vary over the object.

Block 104 comprises deriving, by the processor, for a virtual build volume comprising a representation of at least a portion of the object, a segmentation of the virtual build volume into a plurality of nested segments, wherein deriving the segmentation in block 104 comprises determining a number of nested segments to be derived based on at least one of a geometry of the object and an intended object property (e.g. color, strength, resilience, or the like).

The virtual build volume may for example comprise a boundary box enclosing the object, may be the size and shape of the object (i.e. follow the surfaces of the object), and/or represent at least part of a build volume of fabrication chamber in which the object is to be fabricated. In some examples, the virtual build volume may comprise one or more 'slices', each of which may represent a layer of the object to be fabricated in layer-by-layer additive manufacturing of the object, and/or at least part of a fabrication chamber in which the object is to be fabricated.

The nested segments derived in block 104 comprise a first segment which is associated with first object generation parameters and a second segment which is associated with second, different, object generation parameters. The object generation parameters may for example specify a choice of print agents (for examples, whether colorant(s) may be used in that segment, or a choice of fusing agent to apply, a density of application of the fusing agent, a cluster pattern of application of the fusing agent, or the like). For example, colorants (for example, colorants from a CMYK color set) may be applied in one or more outer segments, but not to one or more inner segments, a low-tint fusing agent (described in greater detail below) may be utilised in outer segments to increase colorfulness, where a segment is formed outside the object, this may be associated with a fusion inhibiting or reducing agent.

In some examples, as described in greater detail below, there may be a plurality of nested peripheral segments arranged about a core segment. Such segments may be peripheral to an inner peripheral segment or to the core segment. The core may comprise any inner segment which has a peripheral segment formed around at least a part thereof.

The nesting of the segments may be complete or partial (i.e. a peripheral segment may extend around the entire perimeter of a core segment or an inner peripheral segment, or around just a portion of the perimeter). In some examples, the peripheral segments may form shells around a core segment.

While in the example of FIG. 1, two segments are described, further segments may be provided. For example, at least three virtual segments, the segmentation may comprise a third segment is associated with third object generation parameters.

The segments may be processed separately when determining instructions for generating the object. Treating a virtual build volume as a plurality of nested segments may have various uses in processing data for additive manufacturing.

For example, when printing 3D color objects, there may be trade-offs between the intended color of the objects and the mechanical properties of the objects. Higher density 3D objects that have significant mechanical strength and functionality can be produced when a greater amount of thermal energy is applied to the build material for fusing the layers together. The amount of thermal energy available for fusing depends in part on the intensity with which the fusing agent absorbs the radiation, and the radiation absorptivity of the fusing agent depends in part on the color of the fusing agent. For example, the absorption intensity of near-infrared colored fusing agent with cyan, magenta, or yellow (C, M, or Y) colorant is generally lower than that of, for example, carbon black-based fusing agent which is an effective absorber of energy. Therefore, the level of fusing of any build material in which colored fusing agents are used may be lower for than it is for similarly produced 3D printed black objects, which results in color objects having lower densities and less mechanical strength and functionality than comparable black objects.

However, by differentiating between segments, a colorful shell may for example be formed around a strong core to which a carbon black based fusing agent is applied. This allows the object to be colorful without unduly compromising its strength.

While a single colored peripheral segment could be determined about a core segment which is fused using carbon black, the color gamut of resulting object may be reduced by the surface visibility of the underlying core segment (which may be particular the case for partially transparent outer peripheral segments; in some examples depending on the thickness of the segments, the transparency thereof may vary). However, this could be at least partially masked by providing an intermediate segment. Thus, determining the number of segments based on an object property may comprise specifying an intended color of an object, and determining if that color can be attained with a single outer shell segment, or if at least one intermediate shell would result in an increased color accuracy (and if so, how many such shells is appropriate). In some examples, a quality specification may be provided: for example, an object having a lower appearance quality specification may be segmented into two segments (e.g. core and crust), while an object having a higher quality specification may be segmented into three segments (e.g. core, mantle and crust).

The number and/or dimensions of colored segments may be kept low as colored print agents may be associated with higher costs. Keeping the number of segments low may also reduce a use of processing resources.

In some examples, determining a number of segments may allow and/or control a gradual transition of properties (e.g. from black to colourful, from opaque to translucent, from stiff to resilient, from conductive to insulating, etc.), for example being based on an intended property gradient.

For example, an object may be generated so as to comprise a core which is relatively strong but may be relatively brittle: overlying peripheral segments of increasing reliance towards the surface may protect the core segment from shattering more effectively than a single resilient segment surrounding the core by absorbing energy while giving an intended surface resilience. If instead there was, for example, a brittle outer segment around a strong core, this could give way in a manner so as to result in a sudden load spike on the core. With a smooth transition across n nested segments, weaker outer segments gradually give way under stress. The number of shells, and their individual resilience, may be determined according to the level of protection and/or the resilience behaviour intended. For example, overlying peripheral segments of increasing resilience towards the surface may protect the core segment from shattering more effectively than a single resilient segment surrounding the core by absorbing energy while giving an intended surface resilience.

In general, each segment may be associated with a stage in a varying property parameter. For example, an outer segment may have a high resilience, an intermediate segment may have an intermediate resilience and a core may have a relatively low resilience (in some examples being relatively brittle depending on the type of material used). In another example, an outer segment may be a color, and in some examples a bright or vibrant color, an intermediate segment may have an intermediate color, or may be light in color and a core may have a relatively dark color. More generally, a property parameter may be intended to have a different value in an object region corresponding to each of the segments. In such examples, the number of the segments may determine the appearance and/or functional behaviour of an object, for example a response to pressure, or an accessible gamut of an outer segment, or the like.

In other words, by providing a number of peripheral segments (e.g. n shells), a smooth and/or gradual transition from core to surface may be made. While color and resilience have been discussed above, determining the number of nested segments may be based on any intended object property for example comprising at least one of an intended object strength, an intended object appearance, and an intended object function (e.g. conductivity).

The number of peripheral segments may be determined so as to provide a core which provides at least a threshold strength and/or so as to provide a threshold color quality such as brightness. In some examples, this may be provided according to a quality specification. For example there may be a greater number of segments when a color quality specification is high than when the colour quality specification is low.

As noted above, the number of nested segments may be based on the object geometry. In some examples, this may comprise determining for example a local feature size (i.e. the local volumetric size of the object), or the cross sectional area of the object at a location. In some examples, this may comprise determining a location of segment (or portion of the segment) within an object: for example, higher portions of the object (i.e. those generated later in an additive manufacturing process) may be associated with a different number of segments than lower portions, and/or upwards facing faces may be associated with a different number segments than downwards facing faces, which may take into account thermal consideration during manufacture, or the like. For example, due to the nature of additive manufacturing, the color of a face of the object may be dependent on the spatial orientation of the face. As a result, the segmentation may be formed based at least in part on the orientation of at least a portion of a face of the object affected by the segment.

The segments may be determined for an object as a whole (or for a build volume encompassing the object as a whole). For example, the object may be divided into a plurality of nested 3D shells. In another example, the segments may be determined for a, or for each, 'slice' of the build volume/object which may correspond to a layer of build material to be processed to generate a layer of the object in a layer-by-layer additive manufacturing process. This may comprise defining concentric 'rings' in each virtual object/build volume slice (which may be non-circular in form).

Figure 2A:
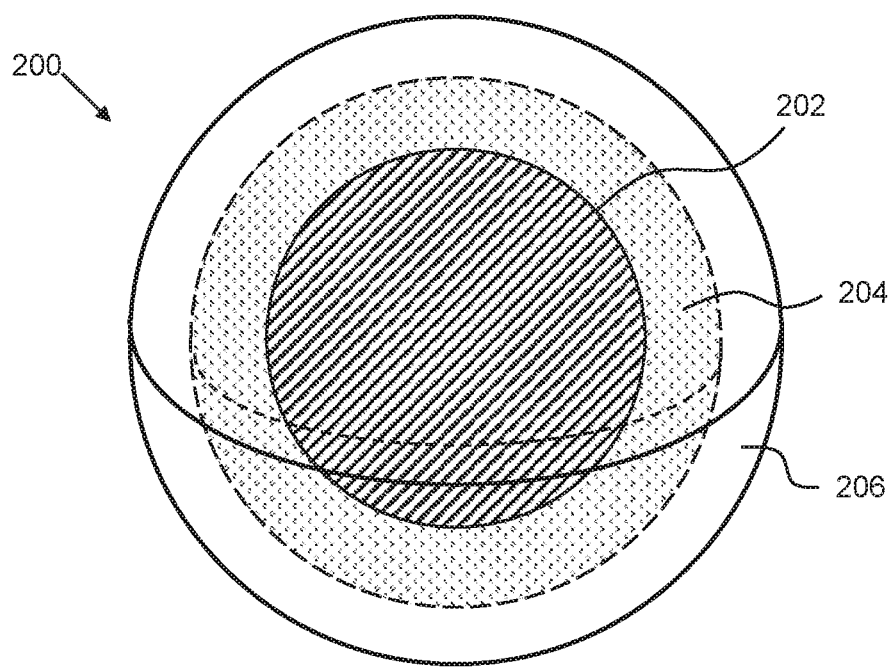
FIGS. 2A, 2B, 2C and 2D show examples of segmented models.

FIG. 2A shows a representation of a 3-dimensional object 200, in this example a sphere, divided into three segments. In this example, there is a core segment 202 surrounded by two concentric shell-like peripheral segments 204, 206. The number of the peripheral segments 204, 206 may be determined according to the method of block 104 above. For the purpose of discussion, the object 200 may be considered to be represented in a manner similar to a 'geological model', having a core (core segment 202), a mantel (inner shell segment 204) and a crust (outer shell segment 206).

Although in this example, the core segment 202 is substantially central within the object 200, this need not be the case in all examples. In addition, while the peripheral segments 204, 206 in this example are concentric, and the boundaries thereof follow the contours of the surface of the object 200, they may lack either or both of these qualities in other examples. Indeed in some examples, there may be a plurality of object core segments 202 around which peripheral segments 204, 206 are formed. Any object segment which has at least one other segment formed amount at least a portion of the periphery thereof may be considered to be a core segment.

Figure 2B:
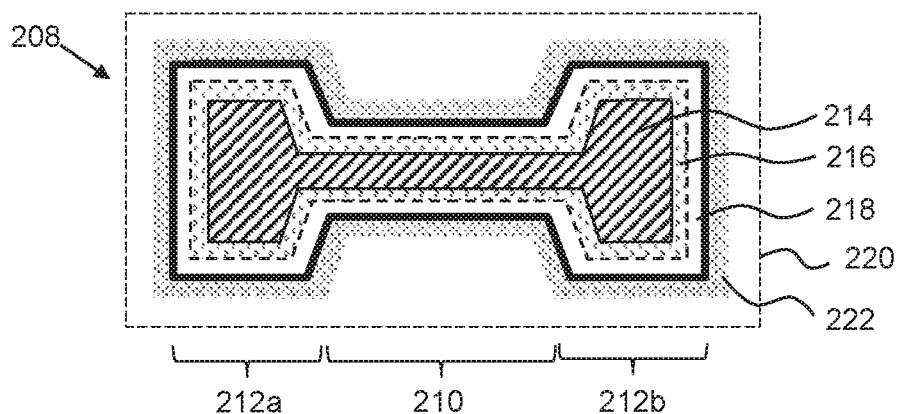

FIG. 2B shows a representation of a slice 208 of an object to be generated. In this example, the object comprises an elongate structure with a narrow central section 210 and two wider end sections 212a, 212b. In this example, the core segment 214 extends towards either end of the object via the central section 210. Two peripheral segments 216, 218 are formed concentrically around the core 214.

A virtual build volume 220 in this example comprises a cuboid encompassing the slice 208.

In this example, there is a further peripheral segment 222 formed in a region of virtual build volume lying outside the object. To continue the example of a geological model above, this peripheral segment 222 may be thought of as comprising the 'atmosphere' of the object. In other words, in some examples determining a peripheral segment in block 104 may comprise determining at least one segment which is external to the object. This segment may be used to define print instructions which may provide thermal control or enhance object properties, as further described below.

Figure 2C:
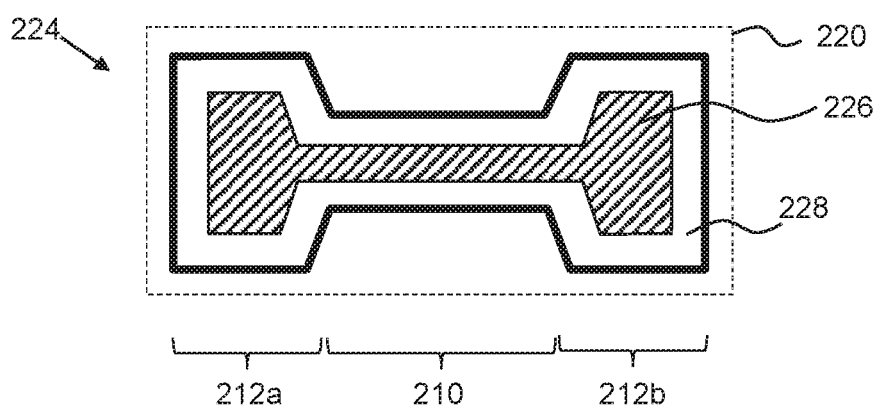

In FIG. 2C a further slice 224 of the object shown in FIG. 2B is shown. In this case, a core segment 226 extends towards either end of the object via the central section 210, there is a single peripheral segment 228 formed (with no defined 'atmosphere' peripheral segment).

Where slices of the object are formed into segments, this may be carried out independently for different segments. For example, a core segment in one slice may be aligned with, partially aligned with, or non-overlapping to a core segment in a previous or subsequent slice. In other words, there may be no particular continuity between object layers: for example, '2D' shells, one slice thick, may be formed without forming continuous 3D shells of the object.

Figure 2D:
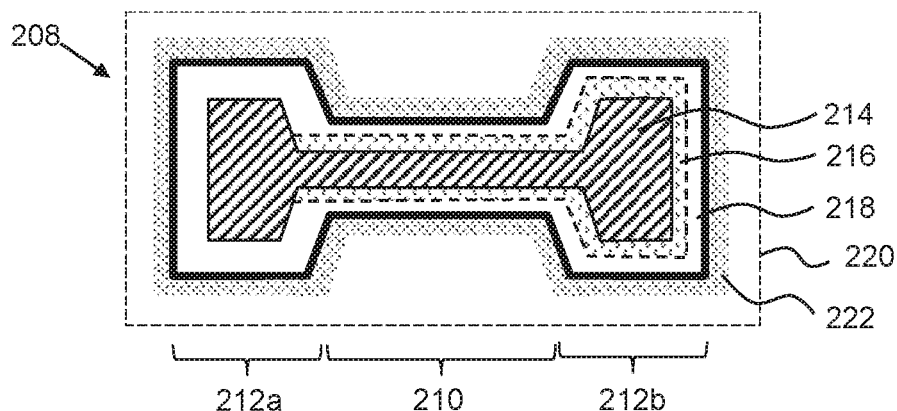

In FIG. 2D, and object which is similar to that shown in FIG. 2B, but with a 'partial' peripheral segment, i.e. one which extends around just part of an inner segment (in this case the core 214). In this example, the core segment 214 extends towards either end of the object via the central section 210. One of the peripheral segments, the outer peripheral segment 218 of the object, extends around the entire core 214, whereas the other peripheral segment, the inner peripheral segment 216 of the object, extends around just part of the core 214.

This may allow properties to be different in different object regions. For example if the peripheral segments 216, 218 are to be processed to provide a colourful shell and the core is to be processed to provide strength (for example, comprising a high proportion of 'carbon black' fusing agent), the region in which there are two peripheral segments 216, 218 may be more colorful when compared to the region in which there is just one peripheral segment 218, as the inner peripheral segment 216 may mask a dark core.

By providing a variable number of segments (e.g. n shells), a smooth and/or gradual transition from core to surface may be made. In some examples, the number of segments may be generally low so as to allow another segment to occupy a greater volumetric proportion. For example, fewer segments overall may allow a particular volume for a particular or each segment, for example allowing a segment (e.g. a core segment) to have a particular strength, fusing heat or the like, to provide a color or transparency or other property, and/or to have a threshold size, or the like.

As noted above, the number of segments may determine a rate of change of characteristics, and by therefore selecting the number of segments, greater control over the characteristics may be obtained. In some examples, the number of segments determined may allow control over a trade-off between appearance properties and mechanical properties.

Defining segments allows for processing of each segment to provide different characteristics: for example, a core may be processed/generated to provide high density and high mechanical strength, and may be surrounded by an outer shell structure with a lower density but high quality vivid color. An intervening peripheral segment may obscure or reduce the effect of a dark core on such a vivid outer peripheral segment. Each segment within an object can be processed using different 3D print processing parameters (resulting in different object generation parameters) chosen to achieve intended characteristics for that segment. The processing parameters may allow selection of predetermined agents and/or amounts or proportions of such agents.

For example, a selection may be made between a lower-tint fusing agent and a carbon black fusing agent, which may increase a gamut of colors available to an object. However, where such an alternative fusing agent is a less efficient thermal absorber and/or more expensive (either in itself or in that more agent or energy may be applied to allow fusing temperatures to be reached), its use may be controlled, such that it is used in just those circumstances where it provides a particular benefit such as colorfulness. For example, its use may be constrained to outer peripheral segments in which the colorfulness can be seen. By defining segments, use of such agents (and the associated cost) may be controlled. For example, just outer segment(s) may be associated with processing parameters which allow the selection of a low-tint fusing agent.

In some examples, lower slices of the object (i.e. to be formed as the initial layers thereof, in other words to be manufactured first in a layer-by-layer manufacturing process) may be segmented such that with higher amounts of fusing agents (or of a more affective fusing agent such as carbon black) may be applied thereto than may be applied to upper faces, which may be absorb heat from a previous layer. For example, there may be fewer or no peripheral segments and colorfulness may be sacrificed for strength.

In other examples, a pattern of application of the agents may vary between the layers. For example, agent clustering may vary to provide or enhance certain properties.

As mentioned above, in some examples, nested peripheral segments may vary in number which provides a greater versatility in additive manufacturing, for example providing a greater range of object functional behaviours, appearance, and the like.

In some examples, the visual specifications for color may vary over an object: portions of the object which are unlikely to be visible in normal use, or which are relatively small or geometrically complex (the human eye being relatively less sensitive to color variations over such areas) may be printed with a lower quality standard applied to color without sacrificing the perceived color quality of the object. As a fine feature is normally weaker than parts with a larger cross-section, any core may for example constitute a relatively large proportion of the cross-sectional area of the object at such a point (which may for example sacrifice colorfulness, although as noted above, this may be less impactful for smaller areas). Thus a number of segments may be reduced in such object portions when compared to other object portions and a use of colored print agents may be reduced.

In another example, the bottom section of an object may have different dimensional tolerances or strength properties than the top of a part. Thus a number of segments may be reduced in such object portions when compared to object portions to be formed later. In addition, this may allow for different thermal properties during a fusing process depending on a location of an object. For example, initial layers (i.e. those formed earlier in additive manufacturing) may, by specifying fewer peripheral segments and/or by specifying that a larger core segment is formed, be provided with higher amounts of fusing agent (or of a more effective fusing agent) than upper layers, which may be absorb heat from a previous layer this may be achieved by defining fewer segments, so a core segment may occupy a larger proportion of the layer.

As mentioned above, in some examples, at least one peripheral segment may be external to the model of the object, comprising an 'atmosphere' segment. This may for example be used to control an extent to which detailing, or fusion inhibiting, agent is applied about the object surfaces. For examples, this may occur when unfused or partially fused build material having a white appearance adheres to the surface of the object. As such agents can be thought of heat reducing, this may be tailored to the amount of heat likely to be generated in a portion of the object: generally, object portions of smaller cross section may generate less heat than object portions of larger cross section. In some examples, build material from outside the object may adhere to the surfaces, which can decrease the quality of the appearance of the object. Therefore, in some examples, color may be added to an external segment to match the color of the object being generated. In other words, the colour may be applied to what is intended to be outside of the object being generated, as some of the build material to which the atmosphere colour is applied may/will become attached to the object.

As applying such color to a region which is intended to be external to the object utilises resources and/or may impact the recyclability of the build material, such a segment be provided in some areas but omitted in other areas, for example where the quality of the appearance may be considered to be of a lower priority. In other examples, color may be used in a first external segment nearer the object, and omitted in a second external segment further from the object, to which a cooling detailing agent may nevertheless be added. Block 104 may comprise, at least in part, determining if such a colored 'atmosphere' segment is to be derived for an object or object portion under consideration. This may allow an intended quality specification in a given build operation to be satisfied without excessive use of colored agents.

Figure 3:
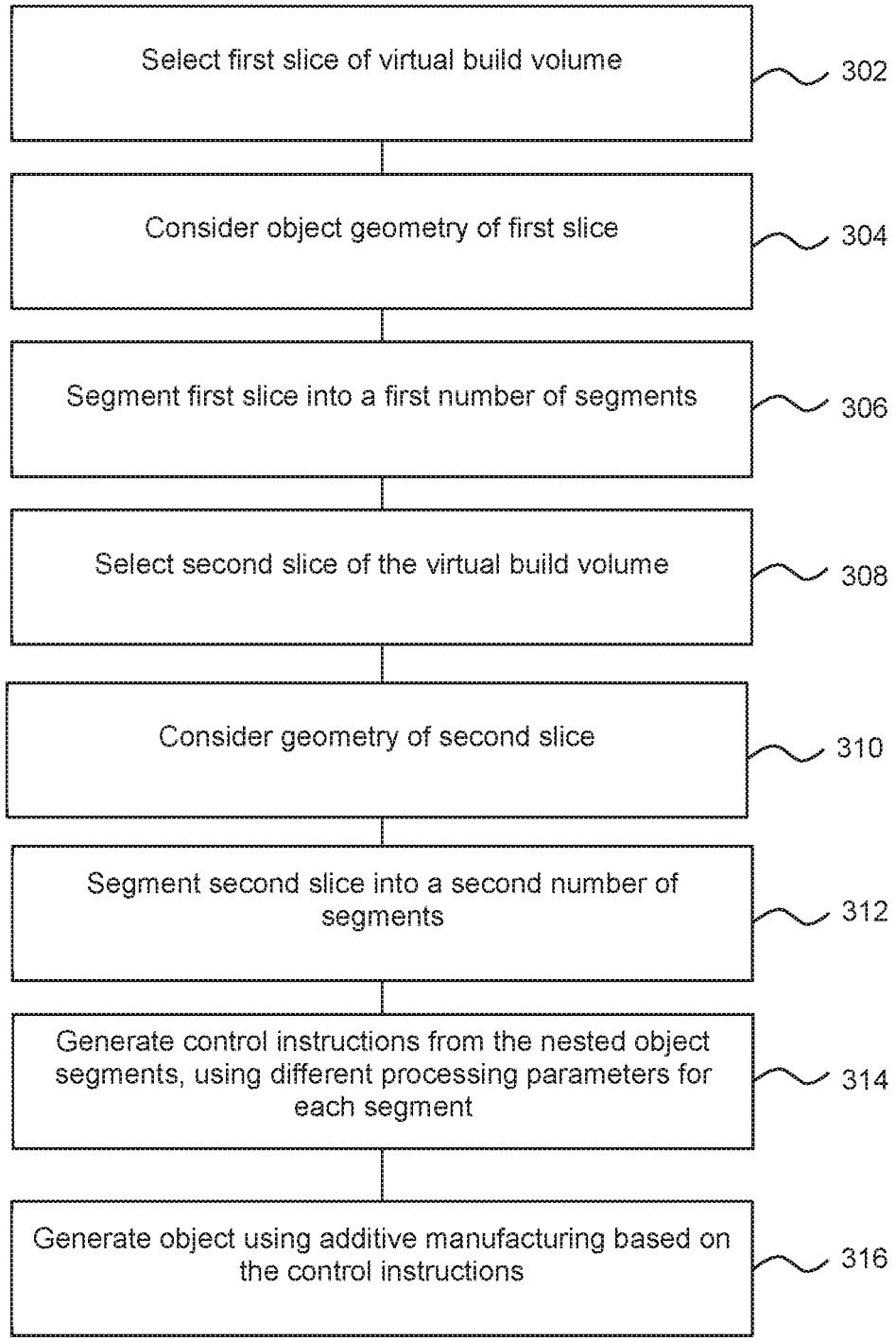
FIG. 3 is an example of a method of generating an object.

FIG. 3 is an example of a method of generating an object, in which blocks 302 to 310 are an example of a method of carrying out block 104 above.

In block 302, a first slice of the virtual build volume is selected. The slice may correspond to a single layer in layer-by-layer additive manufacturing (or more generally to an integer number of layers), and may be described in terms of pixels or voxels (i.e. 3D voxels). A voxel may describe a region of the model and is analogous to a three dimensional pixel. The voxels may be of a consistent shape and size, in some examples being cuboids which are determined such that each voxel can be individually addressed by an object generation apparatus (although such apparatus may also be able to apply print agents with sub-voxel resolution). In some examples, the object properties are specified at voxel resolution. The height of a voxel may correspond to the height of a layer/slice.

In block 304, the object geometry of the first slice is considered, and in this example the local geometry of the object at each point where the segment may exist is considered. When considering a slice of the object, this may comprise determining a cross-section of the slice at that point, or else a 'voxel/pixel density' may be considered.

Determining a voxel/pixel density may comprise considering a fixed spherical/circular radius to determine local feature size and if there is a high proportion of voxels/pixels within this local neighbourhood which are filled with the object, it may be determined that the feature is relatively large. If there are few voxels filled in the local neighbourhood, a small feature may be identified. In other examples, feature size may be determined in some other manner, for example having been tagged by a user or the like.

Block 306 comprises segmenting the slice into a first number of segments based on this determination. In other words, the number of segments formed may vary based on the geometry of the slice. If the slice is narrow, it may contain relatively few segments. If the slice comprises a narrow portion, it may contain relatively few segments overall, or relatively few segments in a narrow portion in relation to another object portion within the slice.

Block 308 comprises selecting a second slice of the virtual build volume. In block 310, the object geometry of the second slice is considered, and in block 312 the second slice is segmented into a second number of segments. This is carried out independently of the analysis of the first slice, and the second number of segments derived may be different. Moreover, the placement of segments may be independent—for example, a core of one slice may be aligned with a core of an adjacent slice, may be offset therefrom, or may be non-overlapping.

While slice geometry has been considered here, in other examples, other properties, such as color (more segments may increase a color gamut), strength (fewer segments may for example allow a strong core to be larger), resilience, other functional properties and/or gradients of such properties (more segments may result in a smoother change in property parameter values), or the location of the slice within an object may be considered in determining how many segments are formed in a slice. Another aspect of the geometry which may be considered is the orientation of a segment within the object (e.g. whether it is in the vicinity of a front facing surface, a backwards facing, an upward facing surface, a downwards facing surface, or a surface formed at some specified angle).

In some examples, a plurality of slices may be segmented in this manner, for examples until a whole object or virtual build volume representing a proposed content of a fabrication chamber has been segmented.

Block 314 comprises generating additive manufacturing control instructions from the nested object segments, wherein the additive manufacturing control instructions for each segment are generated using different processing parameters. For example, the processing parameters may comprise allowing selection of at least one fusing agent, where the available fusing agent and/or the amount to be applied, is different between the segments. The processing parameters for an inner segment may for example allow selection of a 'carbon black' fusing agent (in some examples in combination with a lower-tint fusing agent), whereas surface segment may allow selection of a lower-tint fusing agent and not carbon black fusing agent. Other segments may allow the selection of a mix of such fusing agent. An outer peripheral segment may allow selection of colorants to give access to a larger color gamut than an interior segment. At least one 'atmosphere' segment which is exterior to the object may vary as to the availability of a particular detailing agent and/or colorant selection. Different, or tailored, mapping resources may be used for each segment.

Block 316 comprises generating an object using additive manufacturing based on the control instructions. For example, this may comprise forming successive layers of build material on a print bed and applying print agents according to the control instructions for that layer and exposing the layer to radiation, resulting in heating and fusion of the build material.

The first and the second slices may be to be generated in consecutive layers, or may be separated by intermediate layers.

Figure 4:
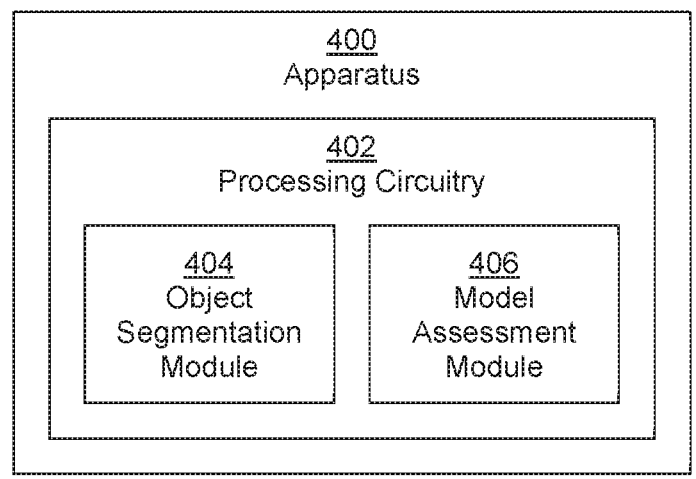
FIGS. 4 and 5 are examples of apparatus for processing data relating to additive manufacturing.

FIG. 4 is an example of an apparatus 400 comprising processing circuitry 402. In this example the processing circuitry 402 comprises an object segmentation module 404 and a model assessment module 406. In use of the apparatus 400, the object segmentation module 404 represents a virtual build volume comprising an object to be generated in additive manufacturing as a plurality of nested segments, wherein a first segment is associated with first object generation parameters and a second segment is associated with second, different, object generation parameters. For example, the first and second object generation parameters may differ in terms of available print agents, print agent ratios, print agent coverage limits, print agent dispersion patterns, and the like. In some examples, the object generation parameters may be reflected in different predetermined mapping resources, which may be used for generating object generation parameters for the segments. The model assessment module 406 determines, from data relating to the object, a number of segments to be formed by the object segmentation module 404.

The processing circuitry 402 may carry out the method of FIG. 1 and/or at least part of FIG. 3.

Figure 5:
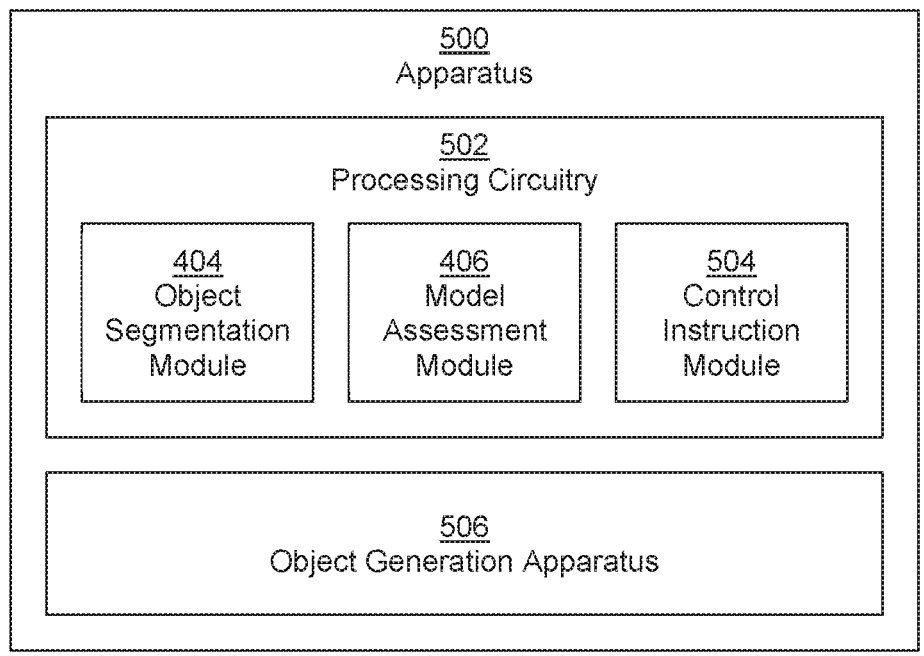

FIG. 5 shows an example of an apparatus 500 comprising processing circuitry 502 which comprises the object segmentation module 404 and the model assessment module 406 as well as a control instruction module 504. The apparatus 500 further comprises an object generation apparatus 506.

In use of the apparatus 500, the control instruction module 504 generates control instructions for generating an object, wherein the generation of control instructions uses different object generation parameters for different segments, for example as described in relation to FIG. 3 above. This may comprise using different mapping resources (e.g. look-up tables or mapping algorithms) for the different segments, for example.

The object generation apparatus 506 is to generate the object according to the control instructions, and may to that end comprise additional components such as a print bed, build material applicator(s), print agent applicator(s), heat sources and the like, not described in detail herein.

The apparatus 500 may carry out the method of FIG. 1 and/or FIG. 3.

Figure 6:
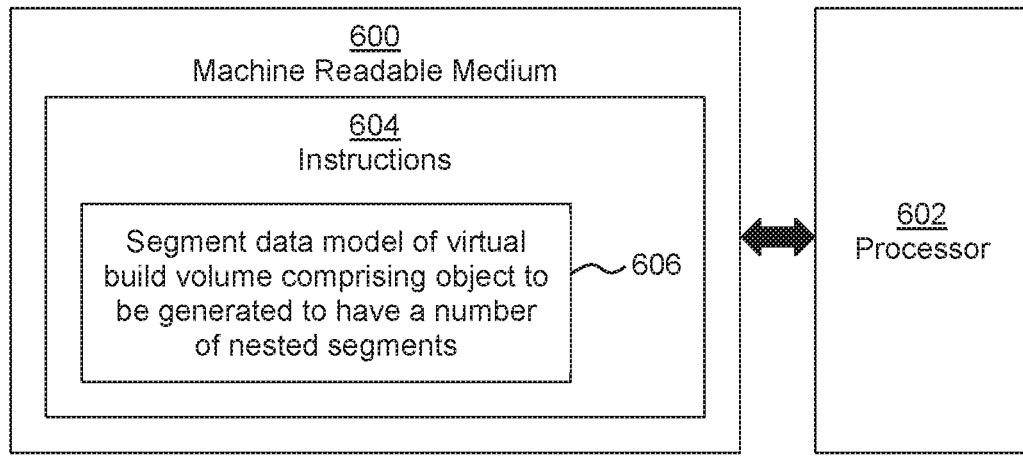
FIG. 6 is an example of a machine readable medium in association with a processor.

FIG. 6 is an example of a tangible, non-volatile, machine readable medium 600 in association with a processor 602, which may carry out at least some of the methods described above. The machine readable medium 600 may be non-transitory and stores instructions 604 which, when executed by the processor 602, cause the processor 602 to carry out processes. The instructions 604 comprise instructions 606 to segment a data model of a virtual build volume comprising an object to be generated in three-dimensional object generation to have a number of nested segments in an object region. As has been described above, this may be based on at least one of: (i) a local volumetric size of the object; (ii) a local orientation of an object feature; (iii) a vertical position of the object region within the object in an orientation of manufacture; and (iv) an intended object property.

In some examples, the instructions 604 may comprise instructions to cause the processor 602 to determine control instructions for generating an object by applying a first set of processing parameters to a first segment and a second set of processing parameters to a second segment. The processing parameters may for example be held in mapping resources or the like.

In some examples, the instructions 604 may comprise instructions to cause the processor 602 to segment a first virtual slice of an object and a second virtual slice of an object independently.

Figure 7:
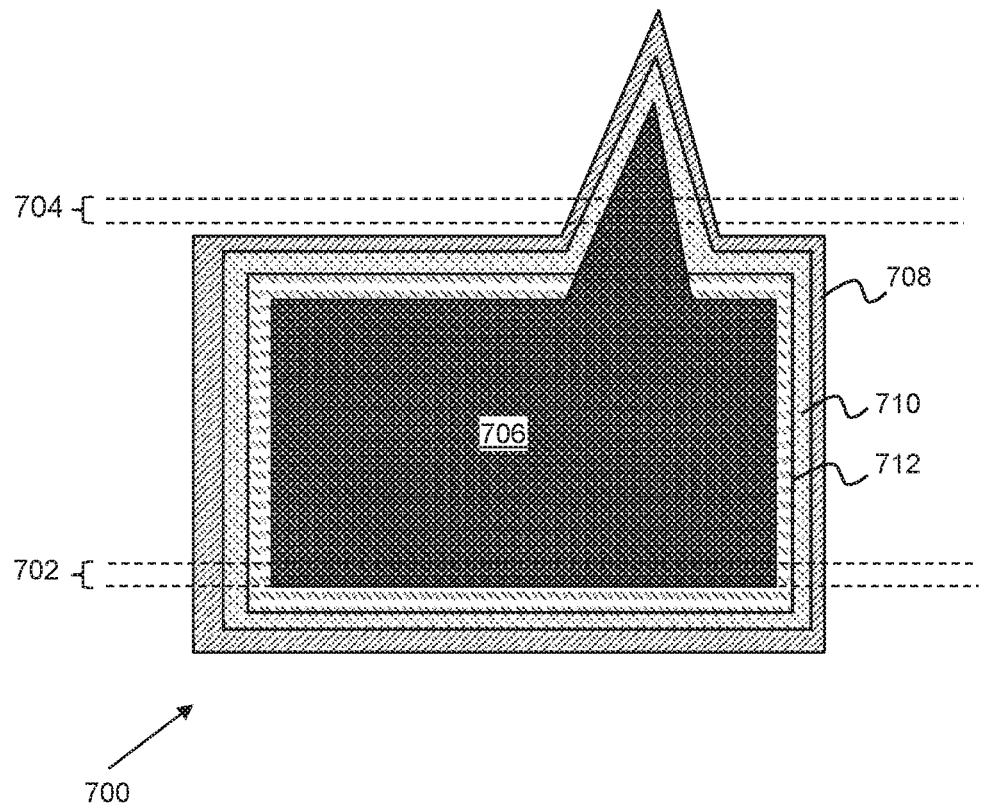
FIG. 7 is an example of an object comprising a plurality of nested portions.

FIG. 7 is an example of an object 700, shown in cross section, which may be fabricated using the processes set out herein. The object 700 comprises a first region 702 and a second region 704 which in this example are parallel planar slices of the object 700, for example corresponding to different layer of the object which are formed during fabrication thereof. Each of the first region 702 and the second region 704 comprises a core portion 706 and a number of nested peripheral portions 708, 710, 712. The core portion 706 comprises fused material having a first composition, for example comprising a fused plastic (which may be a fused plastic powder) treated with a fusing agent (for example, a carbon black fusing agent having a first concentration), and each peripheral portion comprises a fused material having a different composition (for example, different concentrations of fusing agent, different combinations of fusing agents (some of which may comprise colorants in differing amounts) and the like).

The number of nested peripheral portions 708, 710, 712 in the first region 702 is different from the number of nested peripheral portions 708, 710 of the second region 704.

It may be noted that in this example, the first region 702 occupies a first volume and the second region 704 occupies a second volume which is smaller than the first volume, and that the number of nested peripheral portions 710, 712 is higher in the first region 702 than in the second region 704.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that various blocks in the flow charts and block diagrams, as well as combinations thereof, can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices (such as the object segmentation module 404, the model assessment module 406, and the control instruction module 504) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:
1. A method comprising:
receiving, at a processor, a data model of a physical object to be generated by an additive manufacturing apparatus as a plurality of layers on a layer-by-layer basis;

deriving, by the processor, for a virtual build volume containing a representation of the physical object, a segmentation of the virtual build volume into a plurality of nested segments of the representation of the physical object to be generated, wherein the nested segments comprise:
a core segment; and
a nested shell segment at least partially surrounding the core segment;
generating, by the processor, additive manufacturing control instructions from the derived segmentation of the virtual build volume, the additive manufacturing control instructions specifying that:
the core segment, upon generation of the physical object, comprises fused material having a first composition having a first color and a first density; and
the nested shell segment, upon generation of the physical object, comprises fused material having a second composition having a second color different than the first color and a second density less than the first density; and
generating the physical object using the additive manufacturing apparatus in accordance with the additive manufacturing control instructions.

2. The method of claim 1, wherein the segmentation of the virtual build volume is derived such that the nested shell segment is an only nested shell segment and is directly adjacent to the core segment.

3. The method of claim 2, wherein the additive manufacturing control instructions are generated to further specify that:
the fused material of the core segment, upon generation of the physical object, comprises a carbon black fusing agent having a black tint; and
the fused material of the nested shell segment, upon generation of the physical object, comprises a fusing agent having a lighter tint than the black tint of the carbon black fusing agent.

4. The method of claim 1, wherein the nested shell segment is a first nested shell segment, and the segmentation of the virtual build volume is derived such that the nested segments further comprise:
a second nested shell segment that at least partially surrounds and is directly adjacent to the core segment, and that is at least partially surrounded by the first nested shell segment,
and wherein the additive manufacturing control instructions are generated to further specify that:
the second nested shell segment, upon generation of the physical object, comprises fused material having a third composition reducing an effect of the first color of the first composition of the fused material of the core segment or the second color of the second composition of fused material of the first nested shell segment and
the third composition of the second nested shell segment, upon generation of the physical object has a third density between the first density and the second density.

5. The method of claim 4, wherein the additive manufacturing control instructions are generated to further specify that:
the fused material of the core segment, upon generation of the physical object, comprises a carbon black fusing agent having a black tint;
the fused material of the first nested shell segment, upon generation of the physical object, comprises a first fusing agent having a first tint that is lighter than the black tint of the carbon black fusing agent; and
the fused material of the second nested shell segment, upon generation of the physical object, comprises a second fusing agent having a second tint that is darker than the first tint and that is lighter than the black tint, the second fusing agent being different in composition than the first fusing agent.

6. A system comprising:
a processor; and
a memory storing instructions executable by the processor to:
receive a data model of a physical object to be generated by an additive manufacturing apparatus as a plurality of layers on a layer-by-layer basis;
derive, for a virtual build volume containing a representation of the physical object, a segmentation of the virtual build volume into a plurality of nested segments of the representation of the physical object to be generated, wherein the nested segments comprise:
a core segment; and
a nested shell segment at least partially surrounding the core segment;
generate additive manufacturing control instructions from the derived segmentation of the virtual build volume, the additive manufacturing control instructions specifying that:
the core segment, upon generation of the physical object, comprises fused material having a first composition having a first color and a first density; and
the nested shell segment, upon generation of the physical object, comprises fused material having a second composition having a second color different than the first color and a second density less than the first density; and
generate the physical object using the additive manufacturing apparatus in accordance with the additive manufacturing control instructions.

7. A physical object comprising:
a plurality of nested segments;
a core segment of the nested segments, the core segment comprising fused material having a first composition, the first composition having a first color and a first density; and
a nested shell segment of the nested segments, the nested shell segment at least partially surrounding the core segment and comprising fused material having a second composition, the second composition having a second color different than the first color and a second density less than the first density.

8. The physical object of claim 7, wherein the nested shell segment is an only nested shell segment of the object and is directly adjacent to the core segment.

9. The physical object of claim 8, wherein the fused material of the core segment comprises a carbon black fusing agent having a black tint,
and wherein the fused material of the nested shell segment comprises a fusing agent having a lighter tint than the black tint of the carbon black fusing agent.

10. The physical object of claim 7, wherein the nested shell segment is a first nested shell segment, the physical object further comprising:
a second nested shell segment of the nested segments, the second nested shell segment at least partially surrounding and directly adjacent to the core segment and comprising fused material having a third composition reducing an effect of the first color of the first composition of the fused material of the core segment or the second color of the second composition of fused material of the first nested shell segment, the third composition having a third density between the first density and the second density, wherein the first nested shell segment at least partially surrounds the second nested shell segment.

11. The physical object of claim 9, wherein the fused material of the core segment comprises a carbon black fusing agent having a black tint, wherein the fused material of the first nested shell segment comprises a first fusing agent having a first tint that is lighter than the black tint of the carbon black fusing agent, and wherein the fused material of the second nested shell segment comprises a second fusing agent having a second tint that is darker than the first tint and that is lighter than the black tint, the second fusing agent being different in composition than the first fusing agent.

12. The system of claim 6, wherein the segmentation of the virtual build volume is derived such that the nested shell segment is an only nested shell segment and is directly adjacent to the core segment.

13. The system of claim 12, wherein the additive manufacturing control instructions are generated to further specify that:

the fused material of the core segment, upon generation of the physical object, comprises a carbon black fusing agent having a black tint; and the fused material of the nested shell segment, upon generation of the physical object, comprises a fusing agent having a lighter tint than the black tint of the carbon black fusing agent.

14. The system of claim 6, wherein the nested shell segment is a first nested shell segment, and the segmentation of the virtual build volume is derived such that the nested segments further comprise:

a second nested shell segment that at least partially surrounds and is directly adjacent to the core segment, and that is at least partially surrounded by the first nested shell segment, and wherein the additive manufacturing control instructions are generated to further specify that:

the second nested shell segment, upon generation of the physical object, comprises fused material having a third composition reducing an effect of the first color of the first composition of the fused material of the core segment or the second color of the second composition of fused material of the first nested shell segment and the third composition of the second nested shell segment, upon generation of the physical object has a third density between the first density and the second density.

15. The system of claim 14, wherein the additive manufacturing control instructions are generated to further specify that:

the fused material of the core segment, upon generation of the physical object, comprises a carbon black fusing agent having a black tint;

the fused material of the first nested shell segment, upon generation of the physical object, comprises a first fusing agent having a first tint that is lighter than the black tint of the carbon black fusing agent; and the fused material of the second nested shell segment, upon generation of the physical object, comprises a second fusing agent having a second tint that is darker than the first tint and that is lighter than the black tint, the second fusing agent being different in composition than the first fusing agent.

16. The system of claim 6, wherein the system further comprises the additive manufacturing apparatus.

\* \* \* \* \*